Figure 1:
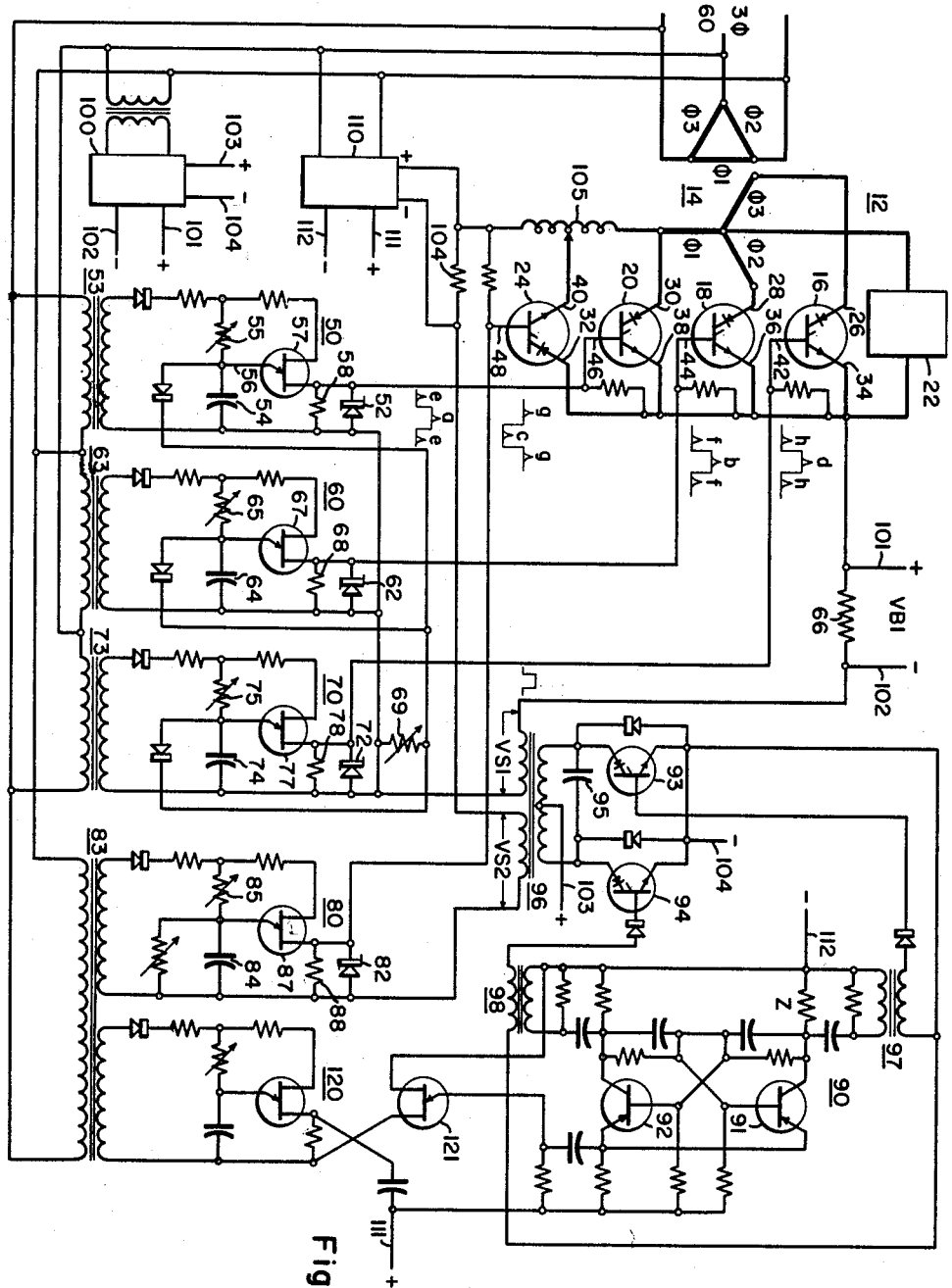

3,183,376
RECTIFIER CIRCUIT FOR PERIODIC REVERSE POWER SUPPLIES
John L. Boyer, Forest Hills, Willard S. Albert, Penn Township, Westmoreland County, and Arthur B. Ross, Latrobe, Pa., assignors to Westinghouse Electric Corporation, East Pittsburgh, Pa., a corporation of Pennsylvania
Filed June 27, 1961, Ser. No. 120,068
9 Claims. (Cl. 307—107)

This invention relates in general to direct current power supplies and more particularly to periodic reverse pulse power supplies.

There are a number of applications which require direct current power with a short intermittent period of reverse polarity. For example, in electroplating some metals it is desirable to have a periodic reverse pulse through the plating bath to provide a much smoother finish and a layer of plating metal of more uniform thickness. When plating some metals it is desirable to have a slow reversal of current flow, while plating of other metals requires a very rapid reversal of the current flow.

Prior art power supplies commonly use mechanical devices. For example, timers and relays are used to control the voltage reversal of motor generator sets. These devices have several disadvantages one of which is the inability to give a rapid reversal of current of the short duration required to plate some types of metal.

Accordingly, it is the general object of this invention to provide a new and improved periodic reverse pulse power supply.

It is a more particular object to provide a new and improved periodic reverse pulse power supply which will provide a very rapid current reversal of a short duration over a wide range of forward and reverse currents.

Still another object of this invention is to provide a new all electronic periodic reverse pulse power supply.

Briefly, the present invention accomplishes the above cited objects by providing forward and reverse poled controlled rectifiers in parallel circuit relationship as the principal elements of a reverse pulse power supply.

The controlled rectifiers are four layer, three electrode devices each having a conducting and a non-conducting state. When the anode is positive with respect to the cathode and a positive pulse is applied to the control electrode with respect to the cathode the device becomes conductive. That is, it becomes a low impedance between anode and cathode. Once rendered conductive the rectifier continues to conduct until the anode potential becomes substantially zero with respect to the cathode. For a more complete description of the controlled rectifier, reference may be had to copending application Serial No. 819,307 entitled "High Current NPNP Switch," filed June 10, 1959 and assigned to the same assignee as the present invention.

The conductivity of the rectifiers of this invention is controlled by the application of signals to the control electrodes such that the forward poled rectifiers conduct during the positive half of alternate cycles of the alternating current from the alternating current source and the reverse poled rectifiers conduct during the negative half of the alternate cycles of the alternating current from the alternating current source when the forward poled rectifiers do not conduct. This results in a current through the load in one direction for approximately 360° of the three phase alternating current from the alternating current source, zero current for approximately 180° of the alternating current input, then a current in the opposite direction for approximately 120° of the alternating current input, and zero for the remaining 60° of the second cycle of the alternating current source. At this point the current again flows through the load in the first direction and the described cycle is repeated.

Further objects and advantages of the invention will become apparent as the following description proceeds and features of novelty which characterize the invention will be pointed out in particularity in the claims annexed to and forming a part of the specification.

Figure 2:
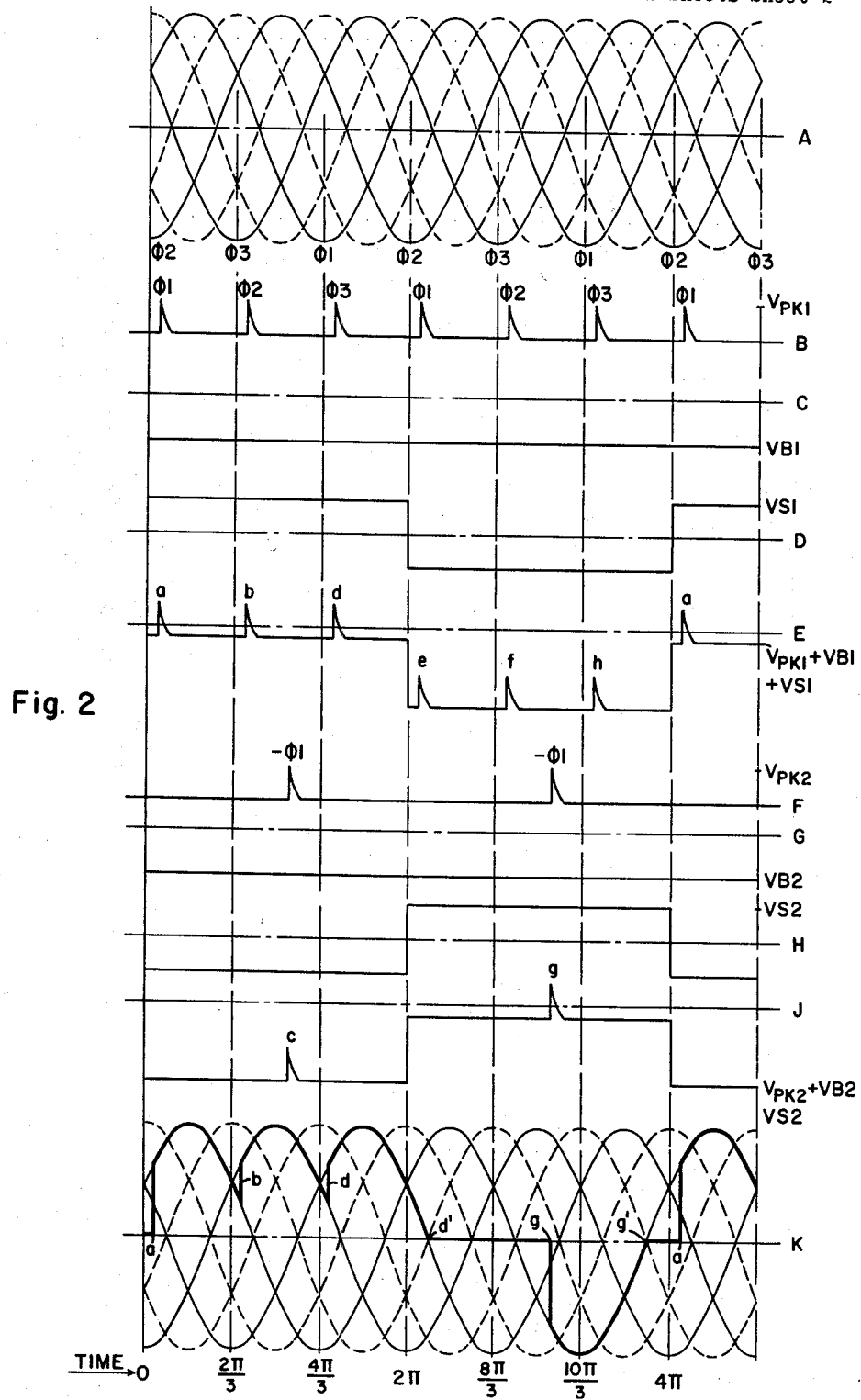

For a better understanding of the invention reference may be had to the accompanying drawings in which:

FIGURE 1 is a schematic diagram of a periodic reverse pulse power supply embodying the teachings of this invention; and, FIG. 2 is a graphic representation of the wave shapes at selected points in the power supply of FIG. 1.

Referring now to FIG. 1, it can be seen that energy is provided to the system by a three phase 60 cycle alternating current source 10. Curve A of FIG. 2A is the graphic representation of this source voltage. The main power circuit 12 of FIG. 1 comprises a three phase delta-Y single way transformer-rectifier circuit. The power is supplied by transformer 14 to controlled rectifiers 16, 18 and 20 each connected in series circuit relationship with the load 22 across the respective phase of the transformer secondary. The reverse poled rectifier 24 is connected in parallel circuit relationship with the forward poled controlled rectifier 20. That is, anode 30 and cathode 38 of controlled rectifier 20 are connected to cathode 40 and anode 32, respectively, of controlled rectifier 24.

Each of the controlled rectifiers 16, 18, 20 and 24 has a control electrode 42, 44, 46 and 48, respectively, and an anode 26, 28, 30 and 32 respectively and a cathode 34, 36, 38 and 40, respectively. Each controlled rectifier is rendered conductive when a pulse positive with respect to the cathode is applied to the control electrode and the anode of that rectifier is also positive with respect to the cathode. For example, controlled rectifier 16 will conduct when the anode 26 has a positive potential applied to it with respect to the cathode 34 and a positive pulse, with respect to the cathode, is applied to the control electrode 42. The anode 26 will be positive during the positive half of every cycle of that phase of the alternating current source 10 that is applied across the controlled electrodes 26 and 34. It is desired to have the controlled rectifiers 16, 18 and 20 conduct during the positive half of alternate cycles of that phase of the alternating current source that is connected across the respective controlled electrodes. This is accomplished by superimposing a pulse, provided by a plurality of pulse generators the operation of which will be described later, on a square wave having a frequency one half the frequency of the alternating current from the alternating current source 10. The pulse applied to each rectifier is synchronized with the alternating current applied across the controlled electrodes of that rectifier. The square wave, produced by a frequency dividing circuit 90, the operation of which will be described later, is always negative at the control electrodes 42, 44 and 46 with respect to the cathodes 34, 36 and 38, respectively, of the forward poled controlled rectifiers 16, 18 and 20, respectively, due to a direct current bias voltage supplied by direct current power supply 100. The pulses superimposed on the square wave are of sufficient magnitude to become positive during that half cycle of the square wave that is least negative but are of insufficient magnitude to become positive during the more negative half cycle of the square wave. The graphic representation of this pulse train superimposed on the square wave is shown as curve E of FIG. 2. The pulses (*a*) and (*e*), (*b*) and (*f*), and (*d*) and (*h*) are supplied by pulse generators 50, 60 and 70, respectively, to controlled rectifiers 20, 18 and 16, respectively. When this voltage is applied to the control electrodes 46, 44 and 42 it can be seen that the forward poled controlled rectifier will conduct during every other positive half cycle of the alternating current applied across the controlled electrodes since the frequency of the square wave is one half the frequency of the alternating current applied to the controlled electrodes. That is, during the more negative half cycle of the square wave the alternating current applied to the controlled electrodes completes one cycle but the controlled rectifiers will not conduct because the pulses (e), (f) and (h) applied to the control electrodes 20, 18 and 16, respectively, are not of sufficient magnitude to trigger the controlled rectifiers.

The pulses from another pulse generator are superimposed on a second square wave having the same frequency but a 180° phase relationship with respect to the above mentioned square wave. This square wave is always negative at the control electrode 48 with respect to the cathode 40 of the reverse poled controlled rectifier 24 due to a direct current bias voltage supplied by direct current power supply 110. Curve J of FIG. 2 is a graphic representation of the voltage applied to the control electrode 48 of the reverse poled controlled rectifier 24. It can be seen that it will conduct during alternate negative half cycles of the alternating current input as shown in curve A of FIG. 2. That is, during alternate cycles of the alternating current the pulse (c) superimposed on the square wave is not of sufficient magnitude to cause the reverse poled controlled rectifier to conduct.

Each of the illustrated pulse generators referred to above comprises a controlled frequency oscillator such as a unijunction transistor relaxation oscillator. The pulses from each pulse generator 50, 60, 70 and 80 are regulated by Zener diodes 52, 62, 72 and 82, respectively. Curve B of FIG. 2 is a graphic representation of the output of the pulse generators 50, 60 and 70 plotted as one curve to show the time relationship of the pulses. Curve F of FIG. 2 is the wave form provided by identical pulse generator 80. The wave form in both curves B and F is shown as the voltage applied to the control electrode with respect to the respective cathode.

Since pulse generators 50, 60, 70 and 80 are all identical, the operation of circuit 50 only will be described. The power for the pulse generator 50 is provided by phase one of the three phase source 10 through transformer 53. The current from the secondary of transformer 53 charges the capacitor 54 through variable resistor 55 until the voltage at the emitter 56 of the unijunction transistor 57 is sufficiently positive to start conduction of the unijunction transistor 57. The capacitor 54 then discharges through the unijunction transistor 57 and the resistor 58 causing a positive pulse across resistor 58. The magnitude of the pulse is limited or regulated by the Zener diode 52. The regulated pulse is applied to the control electrode 46 of controlled rectifier 20 which has its controlled electrodes connected across phase one of the secondary of transformer 14. The resistor 55 can be varied to thereby change the time required to charge capacitor 54 to the required voltage to start conduction of unijunction transistor 57 which in turn varies the timing of the pulse across resistor 58 with respect to the alternating current of phase one of the alternating current source 10. The pulse generators 60, 70 and 80 are connected through transformers 63, 73 and 83, respectively, to phase 2, 3 and 1, respectively, of the alternating current source 10 and provide pulses to control electrodes 44, 42 and 48 of controlled rectifiers 18, 16 and 24, respectively, which have their controlled electrodes connected across phases 2, 3 and 1, respectively. However, pulse generator 80, which controls the reverse poled rectifier 24, provides its pulse during alternate negative half cycles of phase 1 while pulse generator 50 provides its pulse during alternate positive half cycles of phase one. This is accomplished by connecting the primaries of transformers 53 and 83 to have a 180° phase relationship to each other and is necessary because controlled rectifier 24 has the proper potential on anode 32 with respect to cathode 40 to become conductive during the negative half cycle of phase one.

The variable resistors 55, 65 and 75 of pulse generators 50, 60 and 70, respectively, are so adjusted as to delay the pulse slightly. The purpose of the delay is to prevent the pulse from occurring during the transient time of the square wave, which is also triggered by the phase 1 voltage through transformer 83 as will be described more fully hereinafter.

A variable resistor 69 connected in parallel circuit relationship with the capacitors 54, 64 and 74 of generators 50, 60 and 70, respectively, simultaneously varies the timing of the pulse across resistors 58, 68 and 78 of generators 50, 60 and 70, respectively. By varying the resistor 69 the average value of the forward direct current through the load is varied. That is, the pulse from the pulse generator is delayed which, in turn, delays the triggering or start of conduction of the controlled rectifier until later in the cycle of the alternating current applied to the controlled electrodes. This decreases the conduction time or duty cycle of the controlled rectifier and thereby reduces the average direct current through the load due to these controlled rectifiers.

Curve C of FIG. 2 shows the direct current bias voltage provided by power supply 100 across resistor 66 by conductors 101 and 102. The polarity of the bias voltage is such so as to apply a reverse bias to the control electrodes 42, 44 and 46 with respect to the cathodes 34, 36 and 38, respectively, of the forward poled controlled rectifiers 16, 18 and 20.

The pulse generator 80 provides a pulse across resistor 88 when phase 1 of the alternating current source is negative. That is, when anode 32 is positive with respect to cathode 40 of controlled rectifier 24. This pulse across resistor 88 starts conduction of rectifier 24 thereby producing a reverse pulse of current with respect to the current through the controlled rectifiers 16, 18 and 20 through the load 22. The magnitude of the reverse current pulse is determined by the amount of voltage applied across the controlled electrodes 40 and 32 and can be varied by the tap changer 105. The duration of the reverse pulse is controlled by a variable resistor 86 of pulse generator 80. That is, the resistor 86 controls the time necessary to charge the capacitor 84 to the voltage necessary to cause the unijunction transistor 87 to conduct. This of course controls the timing of the pulse across resistor 88 which pulse, in turn, when applied to control electrode 48, controls the time with respect to the alternating current applied to the controlled electrodes 32 and 40 at which the controlled rectifier 24 will become conductive.

A fifth unijunction transistor relaxation oscillator 120 is provided to trigger a unijunction transistor 121 which, in turn, triggers a frequency dividing circuit 90. The relaxation oscillator 120 is exactly like those previously described and is triggered by voltage coupled through transformer 83. The frequency dividing circuit 90 comprises two transistors 91 and 92 connected in a conventional flip-flop circuit arrangement. That is, each time a pulse is applied from unijunction transistor 121, the non-conducting transistor of circuit 90 turns on and the conducting transistor of circuit 90 turns off. Then the succeeding pulse from oscillator 120 turns the conducting transistor off and the non-conducting transistor on so that a positive potential appears at the collector of transistor 91 when the signal at the collector of transistor 92 is zero. When transistor 92 turns on, a positive potential appears at its collector and transistor 91 turns off so that zero voltage appears at its collector. The pulse generator 120 is triggered by the phase 1 voltage so that it is synchronized with the alternating current source 10 and the pulses from generator 120 thereby have the same repetition rate as the alternating current from the alternating current source 10. Since each pulse changes the state of conduction of both transistors 91 and 92, the two substantially square wave outputs have a frequency equal to one half the frequency of the alternating current from the alternating current source 10 and of course have a 180° phase relationship to each other. The square wave from the collector of transistor 91 is applied through transformer 97 to the control electrode of a low power controlled rectifier 93 causing it to conduct. The pulse from the collector of transistor 92 being 180° out of phase with the pulse from the collector of transistor 91 and coupled through transformer 98 triggers a second low power controlled rectifier 94 causing it to conduct and controlled rectifier 93 to turn off. That is, when rectifier 94 is turned on, the capacitor 95, having been charged while rectifier 93 was conducting, places a potential across the controlled electrode of rectifier 93 of such a polarity to turn rectifier 93 off.

The anodes of the controlled rectifiers 93 and 94 are connected one to each end of a center tapped primary winding of transformer 96. The transformer 96 having a two winding secondary provides a square wave at each winding with the two square waves having a 180° phase relationship to each other. One of the two square waves VS1, shown as curve D of FIG. 2, is applied simultaneously across resistors 58, 68 and 78 of pulse generators 50, 60 and 70, respectively. A direct current bias voltage from power supply 100 applied across resistor 66 causes the square wave to always be negative at the control electrodes 42, 44 and 46 with respect to the cathodes 34, 36 and 38. The pulses superimposed on the square wave are of sufficient magnitude to become positive when the square wave is least negative but are not of sufficient magnitude to become positive on the more negative half cycle of the square wave. Therefore, the controlled rectifiers 16, 18 and 20 will conduct only during the positive half cycle of alternate cycles of the alternating current across the controlled electrodes. The second square wave VS2 is 180° out of phase with VS1 and is applied across resistor 88 of pulse generator 80. The second square wave also has a frequency one half the frequency of the alternating current input frequency and is shown as curve H of FIG. 2. The second square wave VS2 is always negative with respect to the cathode 40 of the controlled rectifier 24 because of a direct current bias from another power supply 110 applied across resistor 104. The pulse from pulse generator 80 superimposed on the square wave VS2 is of sufficient magnitude to become positive during the half cycle of the square wave VS2 that is least negative and insufficient to become positive during the more negative half cycle of the square wave VS2.

The resultant voltage applied between cathodes 34, 36 and 38 and control electrodes 42, 44 and 46, respectively, of controlled rectifier 16, 18 and 20, respectively, is shown as curve E of FIG. 2. It can be seen from this curve that during alternate cycles of the alternating current (curve A, FIG. 2) from the alternating current source 10 the controlled rectifiers 16, 18 and 20 will conduct.

Curve J of FIG. 2 represents the voltage applied between the cathode 40 and the control electrode 48 of the reverse poled controlled rectifier 24. It can be seen from this curve that the reverse poled controlled rectifier 24 will conduct during the alternating current input cycle (curve A, FIG. 2) when the forward poled controlled rectifiers 16, 18 and 20 do not conduct.

Referring to FIG. 2, the graphic representation of the current through the load is shown as a heavy line in curve K.

The pulse (a) of curve E of FIG. 2 is applied to the control electrode of the controlled rectifier connected to phase 1 of the alternating current when the voltage across the controlled electrodes is at point (a) of curve A, causing that rectifier to conduct producing the portion of the load current shown in curve K from points (a) to (b). The pulse (b) of curve E is applied to the control electrode of the controlled rectifier connected to phase 2 of the alternating current when the voltage across the controlled electrodes is at point (b) of curve A causing that rectifier to conduct producing the portion of curve K from points (b) to (d). The pulse (c) of curve J being applied to the reverse poled controlled rectifier is ineffective to start conduction of that rectifier because it remains negative with respect to the cathode of that rectifier. The pulse (d) of curve E applied to the control electrode of the controlled rectifier connected to phase 3 of the alternating current at point (d) in curve A causing that rectifier to conduct producing the portion of the load current shown on curve K from points (d) to (d'). During the next positive half cycle of phases 1, 2 and 3 the pulses (e), (f) and (h) respectively are ineffective to render the rectifiers conductive because of their insufficient magnitude. However, the pulse (g) of curve J is applied to the control electrode of the reverse poled controlled rectifier which is connected to phase 1 of the alternating current at point (g) of curve A. This is the proper polarity on the control electrodes of the reverse poled controlled rectifier to cause conduction and the pulse (g) is of sufficient magnitude to start conduction thereby producing a reverse pulse of current in the load as shown from points (g) to (g') of curve K. At this point the predetermined described firing sequence is repeated.

Although the invention has been described as being used in a three phase circuit having three forward poled and one reverse poled controlled rectifiers it is not to be taken as limited to this arrangement. Any single phase or multi-phase source could be used using as many forward and as many reverse poled controlled rectifiers as desired.

While there has been shown and described what is at present considered to be the preferred embodiment of the invention, modifications thereto will readily occur to those skilled in the art. It is not desired, therefore, that the invention be limited to the specific arrangement shown and described and it is intended to cover in the appended claims all such modifications as fall within the true spirit and scope of the invention.

We claim as our invention:

1. In combination, a controlled rectifier having an anode, a cathode, and a control electrode, terminals to which a source of alternating current may be connected, the anode-cathode circuit of said rectifier being serially connected with means to which a load may be connected between said terminals, a pulse circuit, means in said pulse circuit for producing a pulse during each half cycle of the applied alternating current in which said anode-cathode circuit is biased in the proper direction for conduction of said rectifier, means for developing a substantially square wave having a frequency equal to one half the frequency of the applied alternating current, means for superimposing said pulses on said square wave, means for applying the resulting pulse superimposed wave to said control electrode, the peak magnitude of said pulse superimposed square wave being such that said control electrode is biased with respect to said cathode in the proper direction for conduction of said rectifier only when said square wave is at a particular one of its two values.

2. In combination, a power transformer having a polyphase secondary, a plurality of controlled rectifiers each having an anode, a cathode, and a control electrode, the anode-cathode circuit of at least one of said rectifiers being serially connected with means to connect a load between each phase and a neutral of said polyphase secondary, a pulse generating circuit for each of said rectifiers, means in each pulse generating circuit developing a pulse during each half cycle in which the alternating current applied to the anode-cathode circuit of its corresponding rectifier is of proper polarity for conduction of that rectifier, means for superimposing the pulses developed by each pulse generator on a square wave having a frequency equal to one half the frequency of the applied alternating current, and means for applying the resulting pulse superimposed square waves to the control electrodes of the respective corresponding rectifiers, the peak magnitudes of said pulse superimposed waves being such that the control electrode and the cathode of each rectifier are biased in the proper direction for conduction of that rectifier only when the square wave applied to its control electrode is at a particular one of its two values.

3. In combination, first and second controlled rectifiers each having an anode, a cathode, and a control electrode, the anode and cathode of said first rectifier being connected to the cathode and anode, respectively, of said second rectifier, terminals to which a source of alternating current may be connected, the anode-cathode circuits of said first and second rectifiers being serially connected with means to which a load may be connected between said terminals, means for developing first and second substantially square waves having a frequency equal to one-half the frequency of the alternating current applied to said terminals and having a phase relationship of 180° with each other, means for applying said first and second square waves to the control electrodes of said first and second rectifiers, respectively, means for developing a first pulse during each half cycle of one polarity of the applied alternating current, means for developing a second pulse during each half cycle of the opposite polarity of the applied alternating current, means for applying said first and second pulses to the control electrodes of said first and second rectifiers, respectively, the peak magnitude of each pulse superimposed square wave being such that the control electrode of the rectifier to which it is applied is biased in the forward direction with respect to the cathode of that rectifier only when the substantially square wave applied to that control electrode is at a particular one of its two values.

4. In combination, a power transformer having a polyphase secondary, a plurality of controlled rectifiers each having an anode, a cathode, and a control electrode, each phase of said polyphase secondary being connected to a neutral connection through the anode-cathode circuit of one of said rectifiers poled for conduction in one direction, at least one of said phases of said polyphase secondary being additionally connected to said neutral connection through the anode-cathode circuit of one of said rectifiers poled for conduction in the opposite direction, means for connecting a load between said neutral connection and each phase of said polyphase secondary, means for biasing the control electrode of each of said rectifiers to cause conduction of that rectifier when the anode of that rectifier is biased for conduction by alternate cycles of the alternating current appearing in its respective phase of said polyphase secondary, the alternate cycle during which said rectifiers poled for conduction in said one direction are biased for conduction being different than the alternate cycle during which said at least one rectifier poled for conduction in said opposite direction is biased for conduction.

5. In combination, a power transformer having a polyphase secondary, a plurality of controlled rectifiers each having an anode, a cathode, and a control electrode, each phase of said polyphase secondary being connected to a neutral connection through the anode-cathode circuit of one of said rectifiers poled for conduction in one direction, at least one of said phases of said polyphase secondary being additionally connected to said neutral connection through the anode-cathode circuit of one of said rectifiers poled for conduction in the opposite direction, means for connecting a load between said neutral connection and each phase of said polyphase secondary, means for developing first and second substantially square waves having a frequency equal to one-half the frequency of the alternating current coupled through said transformer and having a phase relationship of 180° with each other, means for applying said first square wave to the control electrodes of the rectifiers poled for conduction in said one direction, means for applying said second square wave to the control electrode of said at least one rectifier poled for conduction in said opposite direction, means for applying a pulse to the control electrode of each rectifier poled for conduction in said one direction during each half cycle of one polarity of the alternating current appearing in the phase of said polyphase secondary to which that rectifier is connected, means for applying a pulse to the control electrode of said at least one rectifier poled for conduction in said opposite direction during each half cycle of the opposite polarity of the alternating current appearing in said at least one phase of said polyphase secondary, the peak magnitude of each pulse superimposed square wave being such that the control electrode of the rectifier to which it is applied is biased for conduction of that rectifier only when the substantially square wave applied to that control electrode is at a particular one of its two values.

6. In combination, a power transformer having a polyphase secondary, a plurality of controlled rectifiers each having an anode, a cathode, and a control electrode, each phase of said polyphase secondary being connected to a neutral connection through the anode-cathode circuit of one of said rectifiers poled for conduction in one direction, at least one of said phases of said polyphase secondary being additionally connected to said neutral connection through the anode-cathode circuit of one of said rectifiers poled for conduction in the opposite direction, means for connecting a load between said neutral connection and each phase of said polyphase secondary, means for developing first and second substantially square waves having a 180° phase relationship to each other and a frequency one half the frequency of the alternating current coupled through said transformer, means for applying said first square wave to the control electrodes of said rectifiers poled for conduction in said one direction, means for applying said second square wave to the control electrode of said at least one rectifier poled for conduction in said opposite direction, a first and a second direct current power source supplying a direct current voltage to the control electrode of said rectifiers poled for conduction in said one direction and said rectifiers poled for conduction in said opposite direction, respectively, said first direct current power source being operable to render said first square wave always negative at the control electrodes with respect to the cathodes of the rectifiers poled for conduction in said one direction, said second direct current power source being operable to render said second square wave always negative at the control electrode with respect to the cathode of said at least one rectifier poled for conduction in said opposite direction, means for applying a pulse to the control electrode of each rectifier poled for conduction in said one direction during each half cycle of one polarity of the alternating current appearing in the phase of said polyphase secondary to which that rectifier is connected, means for applying a pulse to the control electrode of said at least one rectifier poled for conduction in said opposite direction during each half cycle of the opposite polarity of the alternating current appearing in said at least one phase of said polyphase secondary, the peak magnitude of each pulse superimposed on a square wave being such that the control electrode of the rectifier to which it is applied is biased for conduction of that rectifier only when the substantially square wave applied to that control electrode is at a particular one of its two values.

7. In combination, a power transformer having a polyphase secondary, a plurality of controlled rectifiers each having an anode, a cathode, and a control electrode, each phase of said polyphase secondary being connected to a neutral connection through the anode-cathode circuit of one of said rectifiers poled for conduction in a first direction, at least one of said phases of said polyphase secondary being additionally connected to said neutral connection through the anode-cathode circuit of one of said rectifiers poled for conduction in a second direction, means for connecting a load between said neutral connection and each phase of said polyphase secondary, means for developing first and second substantially square waves having a frequency equal to one-half the frequency of the alternating current coupled through said transformer and having a phase relationship of 180° with each other, means for applying a pulse superimposed on said first square wave to the control electrode of each rectifier poled for conduction in said first direction during alternate half cycles of one polarity of the alternating current appearing in the phase of said polyphase secondary to which the rectifier is connected causing the respective rectifier to conduct to thereby cause a current to flow through the load in one direction, means for applying a pulse superimposed on said second square wave to the control electrode of said at least one rectifier poled for conduction in said second direction during alternate half cycles of the opposite polarity of the alternating current appearing in said at least one phase of said polyphase secondary causing said at least one rectifier poled for conduction in said second direction to conduct to thereby cause a current to flow through the load in the opposite direction, means operable to vary the magnitude of current through the load in said one direction, the alternate cycle during which said rectifiers poled for conduction in said first direction are causing said current through the load in said one direction being different than the alternate cycle during which said at least one rectifier poled for conduction in said second direction is causing current through the load in said opposite direction.

8. In combination, a power transformer having a polyphase secondary, a plurality of controlled rectifiers each having an anode, a cathode, and a control electrode, each phase of said polyphase secondary being connected to a neutral connection through the anode-cathode circuit of one of said rectifiers poled for conduction in a first direction, at least one of said phases of said polyphase secondary being additionally connected to said neutral connection through the anode-cathode circuit of one of said rectifiers poled for conduction in a second direction, means for connecting a load between said neutral connection and each phase of said polyphase secondary, means for developing first and second substantially square waves having a frequency equal to one-half the frequency of the alternating current coupled through said transformer and having a phase relationship of 180° with each other, means for applying a pulse superimposed on said first square wave to the control electrode of each rectifier poled for conduction in said first direction during alternate half cycles of one polarity of the alternating current appearing in the phase of said polyphase secondary to which the rectifier is connected causing that rectifier to conduct to thereby cause a current flow through the load in one direction, means for applying a pulse superimposed on said second square wave to the control electrode of said at least one rectifier poled for conduction in said second direction during alternate half cycles of the opposite polarity of the alternating current appearing in said at least one phase of said polyphase secondary causing that rectifier to conduct to thereby cause a current flow through the load in the opposite direction, means operable to vary the magnitude of the current through the load in said opposite direction, the alternate cycle during which said rectifiers poled for conduction in said first direction are causing said current through the load in said one direction being different than the alternate cycle during which said at least one rectifier poled for conduction in said second direction is causing current flow through the load in said opposite direction.

9. In combination, a power transformer having a polyphase secondary, a plurality of controlled rectifiers each having an anode, a cathode, and a control electrode, each phase of said polyphase secondary being connected to a neutral connection through the anode-cathode circuit of one of said rectifiers poled for conduction in a first direction, at least one of said phases of said polyphase secondary being additionally connected to said neutral connection through the anode-cathode circuit of one of said rectifiers poled for conduction in a second direction, means for connecting a load between said neutral connection and each phase of said polyphase secondary, means for developing first and second substantially square waves having a frequency equal to one-half the frequency of the alternating current coupled through said transformer and having a phase relationship of 180° with each other, means for applying a pulse superimposed on said first square wave to the control electrode of each rectifier poled for conduction in said first direction during alternate half cycles of one polarity of the alternating current appearing in the phase of said polyphase secondary to which the rectifier is connected causing that rectifier to conduct to thereby cause a current flow through the load in one direction, means for applying a pulse superimposed on said second square wave to the control electrode of said at least one rectifier poled for conduction in said second direction during alternate half cycles of the opposite polarity of the alternating current appearing in said at least one phase of said polyphase secondary causing that rectifier to conduct to thereby cause a current flow through the load in the opposite direction, means operable to vary the duration of the current through the load in said opposite direction, the alternate cycle during which said rectifiers poled for conduction in said first direction are causing a current through the load in said one direction being different than the alternate cycle during which at least one rectifier poled for conduction in said second direction is causing current through the load in said opposite direction.

References Cited by the Examiner
UNITED STATES PATENTS

| | | | |
|---|---|---|---|
| 2,407,072 | 9/46 | Gittings et al. | 307—107 |
| 2,701,852 | 2/55 | Parsons et al. | 307—107 |
| 2,925,546 | 2/60 | Berman. | |

MILTON O. HIRSHFIELD, *Primary Examiner.*